United States Patent Office 2,897,059
Patented July 28, 1959

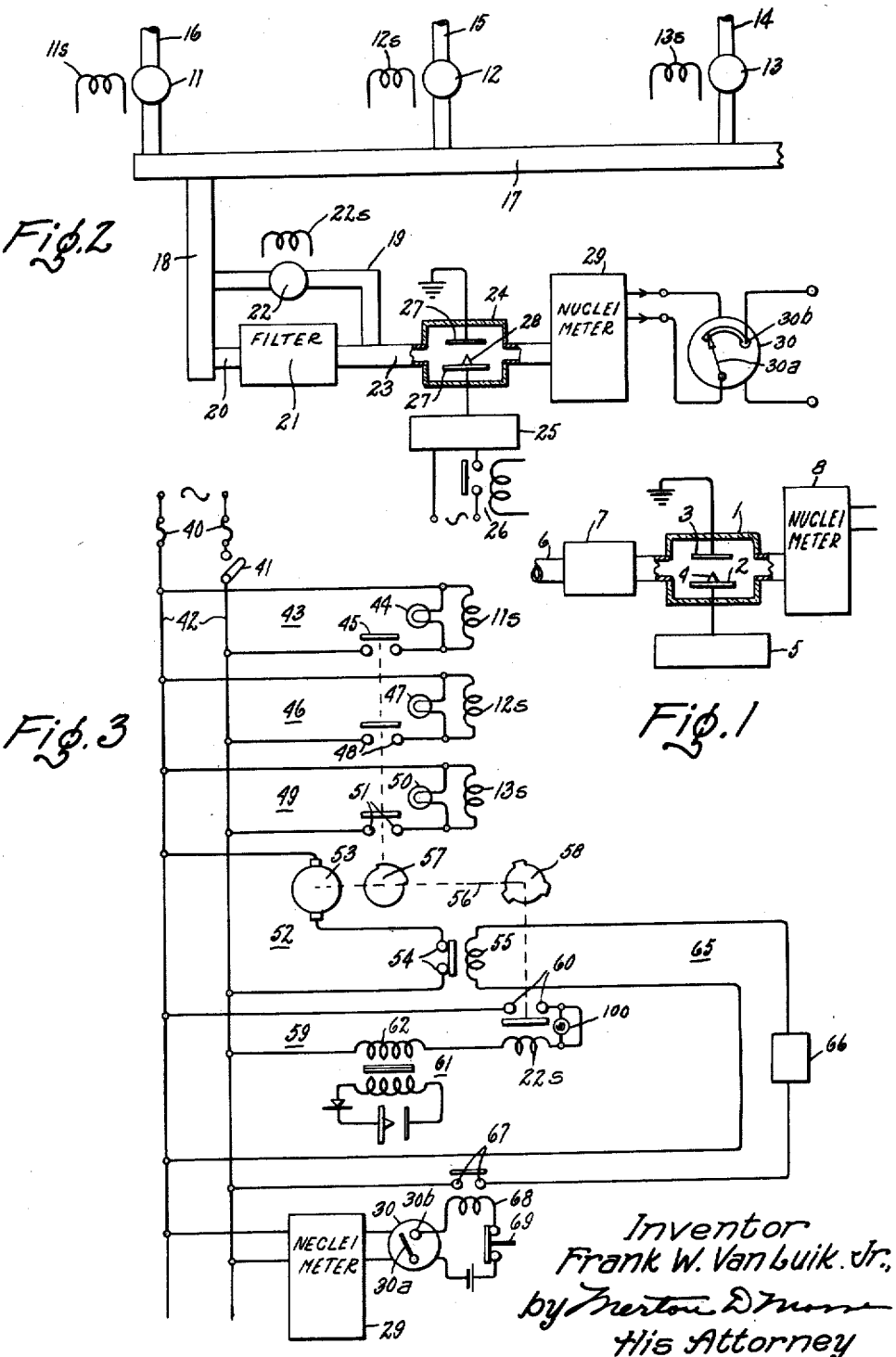

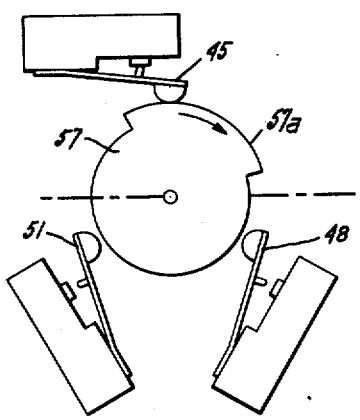
Fig. 4a
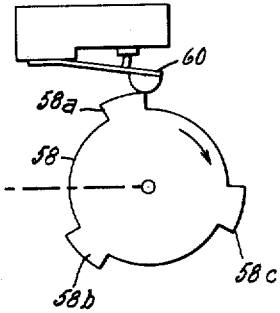
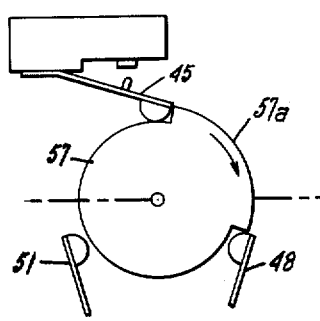
Fig. 4b
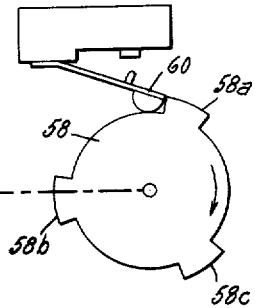
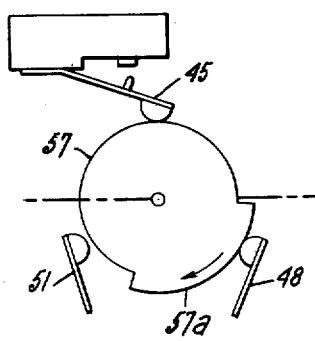
Fig. 4c
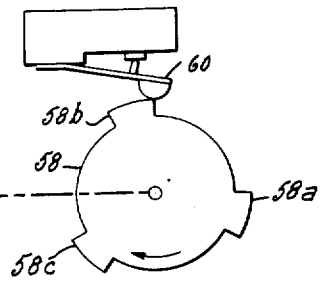
Inventor
Frank W. Van Luik, Jr.,
by Merton D Morse
His Attorney

2,897,059

PROCESS AND APPARATUS FOR GAS DETECTION

Frank W. Van Luik, Jr., Schenectady, N.Y., assignor to General Electric Comany, a corporation of New York Application June 29, 1956, Serial No. 594,820

13 Claims. (Cl. 23—232)

This invention relates to a method and apparatus for the detection of gases. More particularly, this invention relates to an apparatus and a method for detecting gaseous carbon compounds.

For many reasons, not the least of which is the one of health and safety, it is desirable to detect the presence of gaseous carbon compounds such as carbon monoxide and carbon dioxide. In many industrial processes, it is extremely desirable to provide an apparatus which is effective both to detect such gaseous carbon compounds, as well as provide an indication of the quantity thereof. In addition, due to the noxious qualities of these gases, it is often essential to provide an apparatus for detecting even very low concentration thereof. For example, in activities where internal combustion engines are utilized in enclosed areas, such as garages and factories, the health and safety problem becomes extremely critical, since such engines manufacture carbon monoxide during their operation. Consequently, a great need exists for an instrument which detects such gaseous carbon compounds and which has an extremely high order of sensitivity.

In order to achieve a gas-detecting instrument of a high order of sensitivity, it is desirable to utilize condensation nuclei measuring techniques, since there are available condensation nuclei meters having sensitivities of one part in $10^{14}$. Condensation nuclei is a generic name given to small air-borne particles which are characterized by the fact that they will serve as the nucleus on which water, for example, will condense, as in a fog or cloud. Such condensation nuclei encompass particles lying in a size range extending from slightly above molecular size, or $1 \times 10^{-8}$ cm. radius, to $1 \times 10^{-5}$ cm. radius.

The method of measuring condensation nuclei relies on their property of acting as the nucleus of a water drop. If a sample of air containing condensation nuclei is drawn into a chamber and its relative humidity brought up to 100%, adiabatic expansion of the sample will cause the relative humidity to rise instantaneously to a value greater than 100%. The moisture in the air will then tend to condense upon the condensation nuclei particles present. These particles then grow, due to the condensation of the water about them, from their original submicroscopic size to the size of fine fog droplets which may then be measured. It is this growth of water about the particle that gives the necessary magnification to obtain a detective sensitivity of the order of one part by weight in $10^{14}$ parts by weight of air for small particles. An example of such a condensation nuclei measuring device may be found in Patent No. 2,684,008 issued July 20, 1954, to Bernard Vonnegut, and assigned to the General Electric Company.

Consequently, if it is possible in some manner to convert the gaseous carbon compounds, such as carbon monoxide and carbon dioxide, to condensation nuclei particles, it is possible to utilize the highly sensitive and accurate condensation nuclei measuring technique and to provide an extremely sensitive gas detector.

In a similar fashion, since condensation nuclei measuring techniques are of such a high order of sensitivity and are capable of measuring particles of such minute size; i.e., from slightly above $1 \times 10^{-8}$ cm. radius to $1 \times 10^{-5}$ cm. radius, it is possible to detect fires long before visible smoke is present since one of the prime sources of condensation nuclei is the combustion process. Thus an apparatus capable of detecting both gaseous carbon compounds and combustion products would provide an instrument of extreme flexibility having highly desirable characteristics.

It is an object of this invention, therefore, to provide an apparatus and method for detecting gaseous carbon compounds.

It is a further object of this invention to provide an apparatus and method for detecting gaseous carbon compounds utilizing condensation nuclei measuring techniques.

Another object of this invention is to provide an apparatus for converting gaseous carbon compounds into metallic carbonyls.

An additional object of this invention is to provide an apparatus for continuously monitoring a number of widely scattered areas and detecting the presence of gaseous carbon compounds therein.

A further object of this invention is to provide an apparatus for continuously monitoring a number of widely scattered areas and detecting the presence both of combustion products and gaseous carbon compounds.

Yet another object of this invention is to produce an apparatus which is highly sensitive and which is capable of detecting extremely minute quantities of gaseous carbon compound.

Other objects of this invention will become apparent as a description of this invention proceeds.

Briefly speaking, the invention contemplates converting the gaseous carbon compounds into particulate matter such as condensation nuclei which are detected to provide a measure of the gases. The conversion is achieved by passing the gas through a corona discharge. One of the corona-forming elements is constituted of materials which are capable of forming metallic carbonyls with the gaseous carbon compounds. Carbonyls are formed in the corona and produce condensation nuclei upon their subsequent breakdown which are measurable by standard condensation nuclei measuring techniques.

In an alternative embodiment, a converter of the type described is utilized in conjunction with a monitoring system for continuously sampling the air from a number of widely-scattered areas in order to detect the presence of such gaseous carbon compounds as well as combustion products to detect incipient fires. That is, air samples from a number of scattered areas are sequentially applied to a converter unit, which is periodically energized, and subsequently to a condensation nuclei measuring device. If the air samples contain traces of gaseous carbon compounds, these will be converted into condensation nuclei while the converter unit is energized and provide an indication thereof. During the period when the converter is deenergized, the presence of condensation nuclei, above a normal ambient level, represent fire produced combustion products. An alarm system may be coupled to the condensation nuclei measuring device to provide a warning whenever the concentration level of gaseous carbon compounds or of combustion products in any of the monitored areas becomes excessive. Consequently, a device of this type is extremely effective in detecting even small concentrations of gaseous carbon compounds and combustion products in a number of widely-scattered and possibly inaccessible areas.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawing, in which:

Fig. 1 is a schematic illustration of a gaseous converter unit embodying the principles of the instant invention.

Fig. 2 is a schematic illustration of an apparatus for monitoring a number of areas for the presence of gaseous carbon compounds, embodying the converter of Fig. 1.

Fig. 3 is a circuit diagram illustrating the timing circuits for controlling the solenoid valve of Fig. 2.

Figs. 4a, 4b, and 4c are a detailed showing of the solenoid actuating cam members of Fig. 3.

Referring now to Fig. 1, there is illustrated a converter unit for transforming gaseous carbon compounds such as carbon monoxide and carbon dioxide into condensation nuclei which are then capable of measurement by standard condensation nuclei measuring techniques. The converter comprises an airtight housing 1, having mounted therein a pair of corona forming electrodes such as the plates 2 and 3. Fastened to the lower plate 2 is a sharply pointed corona point 4, which may be constituted of iron, nickel, copper, or any other metal capable of forming metallic carbonyls. Connected to the plate 2 of the corona discharge device is a source of high direct-current voltage 5, for producing the corona discharge. The other corona-forming electrode 3 is connected to a source of reference potential, such as ground. The samples to be tested for the presence of gaseous carbon compounds are applied to the corona converter unit 1 through an input conduit 6 and a filter element 7. The filter 7 contains glass wool or, in general, fibrous material and functions to remove any naturally occurring condensation nuclei. The condensation nuclei produced in the converter unit are applied to a condensation nuclei meter 8, which produces an electrical signal proportional to the number of condensation nuclei formed in the converter.

The condensation nuclei meter 8 may be of the type disclosed in the patent to Vonnegut, referred to above, which functions to count the condensation nuclei by causing the condensation of water vapor thereabout. This may be achieved by drawing the sample, now containing condensation nuclei, from the converter and bringing the relative humidity thereof up to 100%. The sample is then expanded adiabatically, causing the sample to become supersaturated, and the moisture in the air then condenses upon the condensation nuclei particles present. The water condenses about these particles to form a cloud of droplets in the path of a beam of light and causes a variation in the intensity thereof. The change in the intensity of the light beam is utilized to produce an electrical signal whose magnitude varies as a measure of the number of particles present.

The output signal from the condensation nuceli measuring device may be utilized to drive the marking element, such as a pen, of a recording device or any other indicating instrument to provide an indication of the number of condensation nuclei produced in the corona converter, and consequently of the amount of gaseous carbon compounds present in the air sample. Alternatively, it may be utilized to actuate an alarm circuit if the gas content exceeds a specified value.

The operation of the gas detector illustrated in Fig. 1 is as follows: Samples of air believed to contain gaseous carbon compounds are drawn into the corona conversion unit through the conduit 6. The samples in passing through the filter 7 are cleansed of all naturally-occurring condensation nuclei, and as a result any condensation nuclei registered by means of the meter 8 will be due solely to the effect of the corona converting unit 1. The corona-forming electrodes 2 and 3 and the corona point 4 produce a corona discharge condition. The corona point 4 is constituted of metals such as nickel, copper, and steel. These metals are those which are capable of forming metallic carbonyls such as $Fe(CO)_5$, $Ni(CO)_4$, and $Cu(CO)_6$. It is believed that the corona discharge acts to ionize the carbon monoxide, which then forms a carbonyl with the metal of the corona point 4. The metallic carbonyls then break down to produce metallic particles and a gas. The metallic particles resulting from the breakdown of the carbonyls then act as condensation nuclei and are drawn into the condensation nuclei meter 8, wherein the number of these condensation nuclei is measured to produce an output signal which is proportional to their number.

Any carbon dioxide present in the air sample is believed to break down into carbon monoxide under the influence of the corona discharge, and again acts to produce carbonyls which, upon dissolution, produce measurable quantities of condensation nuclei. These are similarly brought to the condensation nuclei meter 8 to produce an output signal representative of the number present. Thus, the number of condensation nuclei produced is a direct measure of the amount of the gaseous carbon compounds present, and the electrical output signal will provide an index of the amount of the gaseous carbon compound. It has further been found that a conversion of the gaseous carbon compounds will occur for very low corona currents, those which produce no visible corona.

To demonstrate the validity of the invention, a corona converter of the type illustrated in Fig. 1 was constructed and gaseous carbon compounds such as CO and $CO_2$ were added directly into the corona region and the output from a condensation nuclei meter attached thereto was recorded. Furthermore, room air which at best contains a very low concentration of the gaseous carbon compounds was also passed through the corona region and readings of the condensation nuclei count were obtained. In addition, the voltage applied to the corona-forming electrodes was varied in order to show the effect of various degrees of corona discharge. The following table of readings was obtained:

*Nuclei produced*

|  | 1,000 v. | 2,000 v. | 2,500 v. | 3,000 v. | 7,000 v. | 9,000 v. | 11,000 v. |
|---|---|---|---|---|---|---|---|
| Corona on: |  |  |  |  |  |  |  |
| Air | None | None | None | None | None | $10^6$ | $10^6$ |
| $CO_2$ | None | None | None | $5\times10^5$ | $10^6$ | $10^6$ | $10^6$ |
| CO | None | None | None | $5\times10^5$ | $10^6$ | $10^6$ | $10^6$ |
| Corona off: All gases | None | None | None | None | None | None | None |

From an examination of the values recited in this table, it can be seen that for very low values of corona current such as would be produced by applying voltages in the range of 3000 volts to the electrodes, extremely high readings of condensation nuclei, of the order of several hundred thousand, were produced when gaseous carbon compounds were passed through the corona chamber, whereas none were produced when air not containing carbon compounds was passed therethrough. This indicates quite clearly the high order of sensitivity of this device as a detector of gaseous carbon compounds.

Referring now to Fig. 2, there is disclosed an apparatus for monitoring a number of different, and widely scattered, areas both for the presence of gaseous carbon compounds and combustion products. There is provided a means for selectively sampling the air in a number of scattered areas. To this end, there are provided a number of conduits 14, 15, and 16 which extend from the areas to be monitored to a converting unit such as disclosed in Fig. 1. The passage of air through the conduits 14, 15, and 16 is controlled by means of solenoid operated valves 11, 12, and 13, which function to connect the conduits sequentially to the converting device. The individual conduits are connected to a header 17, which comprises a chamber that permits the air to pass freely from the individual conduits into an output conduit 18 leading into a converting unit. The solenoid-operated valves 11, 12, and 13 are normally closed valves which are energized periodically to open and permit passage of air samples into the header 17 and, consequently, into the converter. As will be explained in greater detail later, with reference to Fig. 3, a timing circuit is provided which sequentially opens the solenoid valves and maintains them in an open position for a fixed period of time.

The air samples, from the monitored areas, are applied through an output conduit 18 to a pair of branch conduits 19 and 20. These branch conduits are provided so that the instant apparatus may be utilized to detect both gaseous carbon compounds and fire produced combustion products. The branch conduit 19 contains a normally-open solenoid valve 22, while the branch conduit 20 contains a filter 21 which may be filled with fiberglass or other similar material in order to remove all naturally occurring condensation nuclei. The conduits 19 and 20 are rejoined to form a single input conduit which is connected to a converting device which transforms the gaseous carbon compounds into condensation nuclei.

There is provided a means for converting gaseous carbon compounds found in the air samples into metallic carbonyls which form condensation nuclei. The manner of achieving this conversion is through a corona-forming device. There is provided an air-tight chamber 24 having an input conduit 23 and an output conduit. Positioned within the air-tight chamber 24 are a pair of corona-forming electrodes such as the plates 27. Attached to the lower corona-forming electrode 27 is a corona point 28 which may be constructed of a metal capable of forming metallic carbonyls in conjunction with gaseous carbon compounds. The corona point 28 may thus be formed either of steel, nickel, or copper, as well as other metal having this characteristic. The upper corona-forming electrode 27 is connected to a source of reference potential, such as ground, while the lower corona-forming electrode is connected to a source of high voltage 25 which is periodically actuated by a solenoid-operated switch 26. The solenoid-operated switch 26 is energized periodically to apply energization to the corona device. The output conduit from the corona converting device 24 is connected to a condensation nuclei meter 29, of the type discussed above, which produces an output signal which is proportional to the number of condensation nuclei produced. The output signal from the condensation nuclei meter 29 is applied to a contact-making microammeter 30, of standard configuration, to energize an alarm system if the condensation nuclei level, and consequently either the gaseous carbon compound level or the combustion product level, reaches a predetermined value. The precise manner in which the solenoid valves 11, 12, 13, and 22 are operated in order to provide a continuous monitoring will be described in greater detail with reference to Fig. 3, which shows the timing circuit for controlling the solenoid valves.

The operation of the monitoring device illustrated in Fig. 2 may be described as follows: The normally closed solenoid valves 11, 12, and 13 are energized sequentially by means of a timing mechanism illustrated in Fig. 3, which will be discussed in greater detail later, to permit the passage of air samples from the area to be monitored through the conduits 14, 15, and 16. Each of the valves is energized for a fixed period of time, such, as for example, two minutes, and air samples flow therethrough. At the end of the fixed period of time, the valve is de-energized, closing its attendant conduit, and the succeeding valve becomes energized. This sequence of events continues until every valve has been energized and then deenergized, at which time the cycle begins again.

Assuming that valve 11 has just been energized to permit passage of air samples therethrough, the valves 12 and 13 are consequently de-energized and remain in their normally closed position condition, thus blocking off any air samples from the apparatus. The air sample from the input conduit 16 is drawn into a common chamber or header 17 and thence through an output conduit 18 into the corona-converter unit 24.

In order to permit both gas and fire detection by means of this apparatus, the air sample brought into the conduit 6 and the valve 11 is not subjected to conversion by means of the corona discharge throughout the period during which valve 11 permits passage of air samples. The two branch conduits 19 and 20 are provided in order to achieve this result. Branch conduit 19 contains a normally open solenoid valve 22, which permits passage of the air sample including all naturally occurring condensation nuclei into the converter 24. The valve 22 is maintained in its normally-open or de-energized condition during the first minute and a half of the two-minute period during which valve 11 is open. Consequently, the air sample passes through the conduit 19 and into the converter unit. However, during this first minute and a half, the converter unit is not energized by virtue of the fact that the solenoid switch 26, which applies energy to the corona-forming electrode 27, is in its de-energized and normally open condition. As a result, the air sample passes into the condensation nuclei meter 29 through the conduit 18, and an output signal is obtained which is a measure of the level of condensation nuclei in the air sample representing those occurring naturally and those due to combustion. At the end of a minute and a half, the timing circuit of Fig. 3 energizes the solenoid valve 22, causing it to assume a closed position. As a consequence, the air sample now passes through the branch conduit 20 and the filter 21 therein. As a result, all naturally occurring condensation nuclei and those due to combustion are eliminated. Thus, the air sample which is drawn through the converter unit 24 contains only traces of the gaseous carbon compounds which it is desired to detect.

Simultaneously with the closing of the solenoid valve 22, the timing circuit illustrated in Fig. 3 energizes the solenoid switch 26 in order to apply an energizing voltage to the corona-forming electrode 27 to produce an invisible corona discharge thereacross. As a result, the gaseous carbon compounds present in the air sample will be converted to metallic carbonyls by virtue of the corona discharge. These metallic carbonyls are drawn into the condensation nuclei meter 29 to produce an indication of the number of condensation nuclei present.

The output signal from the condensation nuclei meter is connected to contact-making microammeter 30. That is, the needle of the microammeter is deflected in response to the magnitude of the output signal from the condensation nuclei meter. Positioned on the face of the meter is a contact element 30b having output leads connected thereto which lead to an alarm circuit to be described later. If the amplitude of the output signal reaches a predetermined critical level, representing a given level of gaseous carbon compounds or combustion products content, the needle 30a is deflected sufficiently to make contact with the contact element 30b, thus closing a circuit which energizes an alarm circuit to provide an indication of a given level of carbon or combustion product concentration. The position of the contact on the face of the meter is adjustable, as is well-known in instruments of this type, to provide various degrees of concentration to which the instrument and the alarm circuit may be made responsive.

At the end of two minutes, valve 11 is de-energized, causing it to close and preventing any further samples from conduit 16 from passing through the converter unit. Simultaneously, the valve 22 in the branch conduit 19 is de-energized and resumes its normally open condition. Valve 12 is now energized to permit passage of air samples from the conduit 15 into the converting and detecting unit. The sequence of events for the conduit 15 and its associated valve 12 is similar to that described with regard to conduit 16 and valve 11, with the same sequence of events taking place. In a similar fashion, the valve 13 is caused to operate upon the termination of the two minute operating time of the valve 12. The entire system will, in this manner, continually repeat this cycle of operation until an alarm condition is observed, in which case, as will be explained in greater detail with reference to Fig. 3, the cycle is interrupted and an indication is provided of the specific conduit in which the critical condition has occurred.

Referring now to Fig. 3, there is illustrated a timing circuit for controlling the operation of the various solenoid valves as well as of the corona conversion device. There is provide a means which selectively energizes the individual solenoid valves 11, 12, and 13 for the desired two minute period. To this end, there is provided a source of alternating current voltage, not shown, to provide energization for the solenoid-actuating circuits. A pair of leads 42 is connected to the source of voltage and provides a means for energizing the circuits. A pair of line fuses 40 are provided and are connected to series with each of the leads 42. A single-pole, single-throw starting switch 41 is connected in one of the leads 42 as a means of energizing the circuit. Connected across the leads 42 is a control circuit 43 for actuating the solenoid for the valve 11. The control circuit 43 consists of a solenoid coil 11S and normally open contact 45 connected in series across the line. The normally-open contact 45 may consist of a microswitch or any other similar device, as will be most clearly seen with reference to Fig. 4. Connected in parallel with the solenoid coil 11S is an incandescent lamp 44 which provides an indication when the solenoid 11S is energized.

The valve 12 is energized by means of a control circuit 46 which also consists of a series-connected solenoid coil 12S and a normally-open pair of contacts 48. An incandescent lamp 47 connected across the solenoid 12S provides an indication when the solenoid is energized.

In a similar fashion, valve 13 is energized by means of a control circuit 49, comprising a solenoid coil 13S and a pair of normally-open contacts 51 connected in series.

Again, an incandescent lamp 50 provides an indication when the solenoid coil is energized. Each of the control circuits, in a fashion similar to control circuit 43, is connected across the power lead 42.

The normally open contacts in each of the solenoid controlled circuits are periodically and sequentially closed by means of a motor-driven cam arrangement in order to energize the individual solenoid control circuits for a fixed period of time. To this end, there is provided a motor-driven cam arrangement. A cam motor control circuit 52 is provided to energize a motor 53 which provides the motive power for the cam arrangement. The motor control circuit 52 consists of a motor 53 connected in series with a pair of normally-closed contacts 54 connected across the power leads 42. The normally-closed contacts 54 are solenoid operated, and when energized function to open the circuit and de-energize the motor 53, thus causing the system to come to a halt. Normally-closed contacts 54 are energized in response to a signal from the condensation nuclei meter, which indicates that an excessively high level of gaseous carbon compounds exists in one of the monitored areas.

The motor 53 drives, by means of a shaft 56, a first cam member 57, which, as can be seen most clearly with reference to Fig. 4, function to close the normally open contacts 45, 48, and 51, in sequence. The specific manner in which cam 57 operates will be described in detail with reference to Fig. 4. However, at this point it is sufficient to point out that the cam 57 operates to sequentially energize the solenoid coils 11S, 12S, and 13S.

After each of the valves 11, 12, and 13 have been energized for a period of a minute and a half to permit detection of fire produced condensation nuclei, it is necessary to energize the valve 22 and to produce a corona discharge within the converter unit 24 to permit conversion and detection of the gaseous carbon compounds. A control circuit 59 connected across the power leads 42 is provided to achieve this result. The control circuit 59 consists of a solenoid coil 22S, a pair of normally-open contacts 60, the primary winding 62 of an iron core transformer 61, and an incandescent lamp 100. The normally-open contacts 60 are closed periodically in order to energize the solenoid coil and the transformer winding. A second cam member 58, mounted on the shaft 56, functions to close the normally-open contacts 60 a minute and a half after each of the valves 11S, 12S, and 13S have been energized. The cam 58, as may be seen most clearly with reference to Fig. 4, contains three projections which operate to close the normally-open contacts 60.

In addition, there is provided an alarm circuit which functions to stop the operation of the timing mechanism and provide an alarm signal if the output of the condensation nuclei meter 29 indicates that a critical level in the gaseous carbon compound content is reached. To this end, there is provided a control circuit 65 connected across the power lead 42, which consists of a solenoid coil 55, an alarm circuit 66, and a pair of normally-open contacts 67. The normally-open contacts 67 are solenoid operated and are closed in response to an alarm signal from the condensation nuclei meter. Upon their closure, the alarm circuit 65 is energized and the alarm 66 may produce an audible signal to indicate the critical condition. Solenoid 55 is also energized and opens the normally-closed contact 54 in the cam control circuit 52. The opening of the normally-closed contact causes the cessation of the cycling of the valves 11, 12, and 13.

The closure of the normally-open contact 67 is controlled by means of the solenoid 68, which in turn is energized by means of the output signal from the condensation nuclei meter. That is, if the contact-making microammeter 30 makes contact with the movable contact element mounted on its face, the circuit to the solenoid 68 is closed and the solenoid 68 is energized through a normally closed reset button 69, thus energizing the alarm circuit 65 and de-energizing the cam control circuit. The reset button 69 is provided in order to start operation of the circuit after an alarm. That is, by pushing the reset button 69, the energizing circuit for the solenoid 68 is interrupted, thus de-energizing the alarm circuit 65 and starting the cycle of operation over again.

Referring now to the operation of the timer illustrated in Fig. 3, the line switch 41 is closed and energized to the power lines 42. Voltage is thus applied to the cam motor 53 through the control circuit 52 including the normally-closed contact 54. The motor 53 rotates the shaft 56 and the cams 57 and 58. The rotation of the cam 57 sequentially closes the normally-open contacts 45, 48, and 51 of the valve control circuit. Assuming that valve control circuit 43 is actuated first, the normally-open contacts 45 are closed, applying voltage to the solenoid 11S and consequently energizing the valve 11 so as to permit the passage of air samples therethrough. Upon energization of the control circuit 43, the incandescent bulb 44 connected in parallel with the solenoid 11S is also energized and produces an indication that particular solenoid and its accompanying valve is energized. The construction of the cam 57 is such, as may be most clearly seen with reference to Fig. 4, that the normally-open contacts 45 are kept closed for a given period of time, such as two minutes, and air samples from the particular conduit controlled by the associated valve are permitted to pass into the converter.

At the end of a minute and a half, the cam member 58 operates to close the normally-open contact 60 in the control circuit 59 of the valve 22. The valve 22 is now energized and actuated into a closed position, so that the air samples to be tested now pass through the filter element 21, as illustrated in Fig. 2, to remove all naturally occurring condensation nuclei. The closure of the normally-open contact 60 also functions to apply power to the corona converter unit 24, since the primary 62 of the transformer 61, which supplies energy to the corona-forming electrode, is in series relation with the elements of the control circuit 59. Consequently, a corona discharge is formed in the converting device 24 and gaseous carbon compounds are converted into metallic carbonyls which, by means of the condensation nuclei meter 29, provide an indication of the level of concentration of gaseous carbon compounds. The incandescent lamp 100 is also energized to provide an indication that the control circuit 59 is in its energized condition.

At the end of the two minute period, the cam 57 has rotated sufficiently to permit the normally-open contacts 45 to open again and de-energize the valve control circuit 43. Simultaneously, the cam member 58 has moved a sufficient distance to open the contacts 60 and de-energize the valve control circuit 59, de-energizing the valve 22 and simultaneously interrupting the corona discharge within the converter unit 24.

Immediately after the de-energization of the valve control circuit 43 through the opening of the contacts 45, the cam member 57 closes the normally-open contact members 48 in the valve control circuit 46. The solenoid 12S and its attending incandescent lamp 47 are now energized and the valve 12 is open in order to permit passage of air samples therethrough. The sequence of events for the valve 12 is identical to that described in relation to the valve 11. At the termination of a two minute period, the control circuit 46 is de-energized and the valve control circuit 49 is, in its turn, energized. In the absence of an alarm signal, the timing mechanism illustrated in Fig 3 will continue the cycle of events, thus permitting the sequential monitoring of the various areas.

In the description of the timing circuit, it has been assumed so far that none of the monitored samples have had a high enough level of gaseous carbon compound or of fire produced condensation nuclei to actuate the operation of the alarm circuit 65. However, assuming that one of the air samples contains a gaseous carbon compound content or combustion product content higher than a specified critical value, the output signal from the condensation nuclei meter 29 will be of a sufficient magnitude to deflect the needle 30a of the contact-making microammeter 30 to a position where it makes contact with the contact 30b positioned on the face thereof. Upon the occurrence of that event, a circuit is completed to energize the solenoid 68 and close the normally-open contacts 67 in the alarm circuit 65.

Upon closure of the normally-open contacts 67, the alarm device 66 is energized in order to produce an alarm which may be either audible or visual. In addition, the solenoid 55 is energized and opens the normally closed contacts 54 in the control circuit for the cam motor 53. As a result, the motor 53 is de-energized and ceases its rotation and prevents further movement of the cam members 57 and 58. Since the cam member 57 has stopped its rotation, one of the valve control circuits 43, 46, or 49 will remain in its energized condition. This permits the identification of the monitored area in which the excessive level of carbon compounds or of combustion products exists. That is, if, for example, valve control circuit 43 and the corona control circuit 59 remain in the energized condition upon cessation of the cam rotation, the incandescent lamps 44 and 100 of the control circuits will remain energized and will thus given an indication that the valve 11 and its associated conduit 6 represents a monitored area whose gaseous carbon compound level is higher than a predetermined critical value. If only the incandescent lamp 44 remains energized, it is clear that conduit 6 represents a monitored area in which an excessive level of combustion product exists, since the corona converter 24 is not energized. In this manner, the timing circuit of Fig. 3 makes it possible to determine quickly and easily which of the monitored areas contains a high concentration of either combustion products or gas.

Referring now to Figs. 4, 4a, 4b, and 4c, the cam members 57 and 58 and their manner of operation are illustrated. The cam 57 consists of a circular main body portion and a projection 57a which functions to close the respective contact members. The projection 57a subtends an angle of approximately 120°, and thus is effective to maintain the individual contacts closed for a period of approximately ⅓ revolution of the cam. The cam member 58, which functions to close the contact 60, similarly contains a round main body portion, and has mounted thereon three projections 58a, 58b, and 58c. These projections subtend an angle of approximately 30° and maintain the contacts 60 closed for a period which is equivalent to ¼ the time which the contacts 45, 48, and 51 are maintained in a closed position.

The magnitude of the projections on the cam members 57 and 58 and their relative position are so constructed that the contacts 60 are closed at an instant when the contacts 45, 48, and 51 have been closed for ¾ of their total closure time. That is, assuming that the contacts 45, 48, and 51 are to be closed for a period of two minutes each, contacts 60 close after the contacts 45, 51, and 48 have been closed for a minute and a half.

The specific manner and sequence in which the contacts are actuated is shown in Figs. 4a, 4b, and 4c, in which such a sequence is illustrated. Fig. 4a illustrates the relationship between the closure time of contacts 45 and 60. That is, contacts 45 have been closed by means of the projection 57a for approximately ¾ of its total closure time having traversed ¾ of the distance along the periphery of 57a. At this point, the projection 58a has just closed the contact 60 in order to energize control circuit 59 of Fig. 3.

Fig. 4b illustrates the changeover sequence so that the control circuit which has previously been energized is now de-energized, and the next control circuit is energized. That is, projection 57a has passed the contacts 45, permitting them to open, and is about to engage the contacts 48 and energize the succeeding control circuit. Simultaneously, the projection 58a on the cam member 58 has slipped away from the contacts 60, permitting them to open and remain open for the next minute and a half, until the projection 58B engages the contacts.

Fig. 4c illustrates the next point in the cycle at which the contacts 60 are again closed in order to control the energization of the corona converter unit 24. The cam portion 57a has traversed ¾ of its length underneath the contacts 48 and they have thus been maintained in a closed position for ¾ of their closure period, or about a minute and a half. At this point, projection 58b of the cam 58 is about to engage contacts 60 in order to energize the circuit 59 of Fig. 3 and thus apply energy to the corona conversion unit 24. In a similar fashion, a half a minute later, contacts 48 will open, de-energizing solenoid control circuit 46 and simultaneously contacts 60 will also open, de-energizing the control circuit 59. It can be seen that the contacts 51 will next be closed in order to energize the control circuit 49, and similarly the projection 58c of the cam member 58 will, in turn function to close contacts 60 after a minute and a half have passed.

It can be seen from the description of Fig. 4 that by means of this cam arrangement the valve control circuits are sequentially energized to permit the continuous monitoring of a number of areas. Although a cam of one particular configuration has been disclosed, it is obvious that cams of different configuration capable of performing the same cycle of events may be utilized. Furthermore, it is also obvious that other timing cycles may be utilized while still keeping within the spirit of the instant invention.

While particular embodiments of this invention have been shown, it will, of course, be understood that the invention is not limited thereto since many modifications, both in the circuit arrangement and in the instrumentalities employed, may be made. It is contemplated by the appended claims to cover any such modifications as fall within the true spirit and scope of this invention.

What I claim as new and desire to secure by Letters Patent of the United States is:

1. An apparatus for detecting gaseous carbon compounds in a mixture of gases including in combination, means to free said mixture of condensation nuclei, means adapted to receive said nuclei-free mixture to convert a portion of said gaseous carbon compound to condensation nuclei including corona discharge means, and means to detect said condensation nuclei to provide a measure of said gaseous carbon compound.

2. An apparatus for detecting gaseous carbon compounds present in a mixture of gases including in combination, means to free said mixture of condensation nuclei, means adapted to receive said nuclei-free mixture to convert a portion of said carbon compound to metallic carbonyls by a corona discharge, and means coupled to said converting means to detect said carbonyls to provide a measure of said gaseous carbon compound.

3. An apparatus for detecting gaseous carbon compounds in a mixture of gases including in combination, means to free said mixture of condensation nuclei, corona discharge forming means to convert a portion of said carbon compound in said nuclei-free mixture to metallic carbonyls which act as condensation nuclei, including an electrode of a metal capable of forming said carbonyls in conjunction with said gaseous carbon compound, and means coupled to the output of said converting means to detect said carbonyl condensation nuclei to provide a measure of said gaseous carbon compound.

4. An apparatus for detecting gaseous carbon compounds in a mixture of gases including in combination, means to free said mixture of condensation nuclei, corona discharge forming means adapted to receive said nuclei-free mixture to convert a portion of said carbon compound to metallic carbonyls which act as condensation nuclei including two electrodes, one of which has a pointed configuration and is formed of a metal capable of forming said carbonyls with said gaseous carbon compound, and means coupled to the output of said converting means to detect said carbonyls to provide a measure of said gaseous carbon compound.

5. An apparatus for detecting gaseous carbon compounds in a mixture of gases including in combination, filter means to free said mixture of condensation nuclei, corona discharge forming means coupled to the said filter means to convert a portion of said gaseous carbon compound to ferrous carbonyls which act as condensation nuclei including a corona point formed of a ferrous material, and means coupled to said converting means to detect said carbonyl condensation nuclei to provide a measure of said gaseous carbon compound.

6. An apparatus for detecting gaseous carbon compounds in a mixture of gases including in combination, filter means to free said mixture of condensation nuclei, corona discharge forming means coupled to said filter means to convert a portion of said gaseous carbon compound to nickel carbonyls which act as condensation nuclei including a corona point formed of nickel, and means coupled to said converting means to detect said carbonyl condensation nuclei to provide a measure of said gaseous carbon compound.

7. An apparatus for detecting gaseous carbon compounds in a mixture of gases including in combination, filter means to free said mixture of condensation nuclei, corona discharge forming means coupled to said filter means to convert a portion of said gaseous carbon compound to cuprous carbonyls which act as condensation nuclei including a corona point formed of copper, and means coupled to said converting means to detect said carbonyl condensation nuclei to provide a measure of said gaseous carbon compound.

8. An apparatus for detecting gaseous carbon compounds in a mixture of gases including in combination, filter means to free said mixture of condensation nuclei, converter means including an air tight housing containing corona forming electrodes for converting said gaseous carbon compounds to metallic carbonyls which act as condensation nuclei, one of said electrodes being constituted of a metal capable of forming said carbonyls in conjunction with said gaseous carbon compound, energizing means for electrodes to provide a corona discharge, conduit means connecting said filter and said housing to supply said gaseous carbon compounds to said converter means, and means to detect said carbonyl condensation nuclei to provide a measure of said gaseous carbon compound.

9. An apparatus for continuously monitoring a number of scattered areas for the presence of gaseous carbon compounds including in combination, means to sample selectively the gaseous mixture from a number of scattered areas, means including corona discharge means coupled to said sampling means to convert a portion of said gaseous carbon compounds to metallic carbonyls which act as condensation nuclei, means coupled to said converting means to detect said carbonyl condensation nuclei to provide an indication of the presence and amount of gaseous carbon compound in each area.

10. An apparatus for continuously monitoring a number of separate areas for the presence of gaseous carbon compounds including in combination, a multiplicity of individual conduits for providing gaseous samples from the areas to be monitored, means including corona discharge means for converting gaseous carbon compounds to metallic carbonyls which act as condensation nuclei, means to apply the samples from said conduits selectively to said converting means, means to detect said carbonyl condensation nuclei to provide an indication of the presence and amount of gaseous carbon compound in the areas monitored.

11. An apparatus for continuously monitoring a number of separate areas for the presence of gaseous carbon compounds including in combination, a multiplicity of individual conduits for providing gaseous samples from the areas to be monitored, means for converting gaseous carbon compounds to metallic carbonyls which act as condensation nuclei including corona discharge forming means having an electrode element of a metal capable of forming carbonyls with said gaseous carbon compound, means to apply the gaseous samples from said conduits selectively to said converting means, and means to detect said carbonyl condensation nuclei to provide an indication of the presence and amount of gaseous carbon compound in the monitored areas.

12. In a method for detecting gaseous carbon compounds in a volume of gas steps comprising freeing a selected portion of said gas of condensation nuclei, reacting the gaseous carbon compound with a metallic element to form the carbonyl of said metal, the carbonyl thus formed being capable of forming condensation nuclei upon disassociation, detecting the condensation nuclei resulting from disassociation to provide a measure of the amount of the gaseous carbon compounds.

13. An apparatus for continuously monitoring a number of separate areas for the presence both of gaseous carbon compounds and condensation nuclei forming combustion products, including in combination, a multiplicity of individual conduits for providing air samples containing both gaseous carbon compounds and combustion products from the areas to be monitored, means for converting gaseous carbon compounds in said samples to metallic carbonyls to provide condensation nuclei including corona discharge forming means having an electrode element of a metal capable of forming carbonyls with said gaseous carbon compound, means to apply air samples to said converting means for a fixed period from each of said individual conduits, means to energize said converting means for a portion of said fixed period whereby metallic carbonyls are produced during a portion of said period only, means to detect condensation nuclei during all of said period whereby both gaseous carbon compounds and condensation nuclei forming combustion products are indicated.

References Cited in the file of this patent

UNITED STATES PATENTS

| | | |
|---|---|---|
| 2,034,281 | Buchholz | Mar. 17, 1936 |
| 2,774,652 | Vonnegut | Dec. 18, 1956 |

FOREIGN PATENTS

| | | |
|---|---|---|
| 441,921 | Great Britain | Jan. 27, 1936 |

OTHER REFERENCES

Mellor: Comprehensive Treatise on Inorganic and Theoretical Chemistry, vol. 5, page 953, Longmans, Green & Co., N.Y., 1924.